US012686743B2

(12) United States Patent
Claridge et al.

(10) Patent No.: US 12,686,743 B2
(45) **Date of Patent: *Jul. 21, 2026**

(54) STRUCTURED ORGANIC FILMS CONTAINING IMIDAZOLIUM HAVING CATIONIC CHARGE FUNCTIONALITY AND METHODS THEREOF

(71) Applicant: Genesee Valley Innovations, LLC, Santa Clara, CA (US)

(72) Inventors: Robert Claridge, Gilford (CA); Valerie M. Farrugia, Oakville (CA); David Lawton, Burlington (CA)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 657 days.

This patent is subject to a terminal disclaimer.

(21) Appl. No.: 17/946,007

(22) Filed: Sep. 15, 2022

(65) Prior Publication Data

US 2024/0110008 A1 Apr. 4, 2024

(51) Int. Cl.

| | |
|---|---|
| ***C08G 65/48*** | (2006.01) |
| ***B01J 41/13*** | (2017.01) |
| ***C08J 5/22*** | (2006.01) |
| ***H01M 8/103*** | (2016.01) |
| ***H01M 8/1067*** | (2016.01) |
| *H01M 8/10* | (2016.01) |

(52) U.S. Cl.

CPC .............. *C08G 65/48* (2013.01); *B01J 41/13* (2017.01); *C08J 5/2256* (2013.01); *H01M 8/103* (2013.01); *H01M 8/1067* (2013.01); *C08J 2371/08* (2013.01); *H01M 2008/1095* (2013.01)

(58) Field of Classification Search

CPC ................................ H01M 8/103; B01J 41/13

See application file for complete search history.

(56) References Cited

U.S. PATENT DOCUMENTS

| | | | |
|---|---|---|---|
| 3,018,272 | A | 1/1962 | Griffing et al. |
| 5,011,956 | A | 4/1991 | Ford et al. |
| 5,119,314 | A | 6/1992 | Hotta et al. |
| 7,108,935 | B2 | 9/2006 | Bauer et al. |
| 8,029,857 | B2 | 10/2011 | Hoek et al. |
| 8,093,347 | B2 | 1/2012 | Heuft et al. |
| 8,119,315 | B1 | 2/2012 | Heuft et al. |
| 8,264,516 | B2 | 9/2012 | Steven et al. |
| 8,313,560 | B1 | 11/2012 | Cote et al. |
| 8,318,892 | B2 | 11/2012 | Cote et al. |
| 8,353,574 | B1 | 1/2013 | Heuft et al. |
| 8,377,999 | B2 | 2/2013 | Cote et al. |
| 8,389,060 | B2 | 3/2013 | Heuft et al. |
| 8,410,016 | B2 | 4/2013 | Cote et al. |
| 8,436,130 | B2 | 5/2013 | Cote et al. |
| 8,518,253 | B2 | 8/2013 | Xiong et al. |
| 8,529,997 | B2 | 9/2013 | Heuft et al. |
| 8,591,997 | B2 | 11/2013 | Heuft et al. |
| 8,652,043 | B2 | 2/2014 | Drucker et al. |
| 8,765,340 | B2 | 7/2014 | Vella et al. |
| 8,906,462 | B2 | 12/2014 | Wigglesworth et al. |
| 9,097,995 | B2 | 8/2015 | Heuft et al. |
| 9,309,343 | B2 | 4/2016 | Van Berchum et al. |
| 9,375,678 | B2 | 6/2016 | Nair et al. |
| 9,580,824 | B2 | 2/2017 | Masel et al. |
| 9,768,502 | B2 | 9/2017 | Lin |
| 9,815,032 | B2 | 11/2017 | Hill et al. |
| 9,950,549 | B2 | 4/2018 | Kanungo et al. |
| 10,076,728 | B2 | 9/2018 | Song et al. |
| 10,258,932 | B2 | 4/2019 | Birss et al. |
| 10,281,831 | B2 | 5/2019 | Cote et al. |
| 10,347,939 | B2 | 7/2019 | Choi et al. |
| 10,384,441 | B2 | 8/2019 | Badesha et al. |

(Continued)

FOREIGN PATENT DOCUMENTS

| | | | |
|---|---|---|---|
| CA | 2833684 | A1 | 1/2013 |
| CN | 107915658 | B | 4/2020 |

(Continued)

OTHER PUBLICATIONS

Li et al. Defective 2D Covalent Organic Frameworks for Postfunctionalization. Adv. Funct. Mater. 2020, 30, 1909267 (Year: 2020).*

Agari et al., "Estimation of the compositional gradient in a PVC/PMMA graded blend prepared by the dissolutionediffusion method," ScienceDirect, Polymer (2007) 1139-1147.

Alabi et al., "Electrostatically-coupled graphene oxide nanocomposite cation exchange membrane," Journal of Membrane Science 594 (2020) 117457, 10 pages.

Banerjee et al., "Nafion Perfluorinated Membranes in Fuel Cells," Journal of Fluorine Chemistry 125 (2004) 1211-1216, 6 pages.

(Continued)

*Primary Examiner* — Stephen E Rieth

(74) *Attorney, Agent, or Firm* — MH2 Technology Law Group LLP

(57) ABSTRACT

A structured organic film (SOF) is disclosed including a plurality of segments, a plurality of linkers, and a plurality of ionic capping segments, where at least one or more ionic capping segments may include imidazolium. Implementations of the structured organic film (SOF) include where a concentration of ionic capping segments in the SOF is from about 0.1 to about 5.0 molar equivalents of ionic capping segments as compared to a concentration of nonionic segments in the SOF. A thickness of the SOF is from about 100 nm to about 500 μm. At least one of the plurality of ionic capping segments may include n-hydroxyethyl-1,2,4,5-tetramethylimidazolium (NETMImBr). At least one of the plurality of ionic capping segments may include n-hydroxypropyl-1,2,4,5-tetramethylimidazolium (NPTMImBr). An ion-exchange membrane may include the structured organic film (SOF).

9 Claims, 1 Drawing Sheet

(56) References Cited

U.S. PATENT DOCUMENTS

| | | | |
|---|---|---|---|
| 10,570,524 B2 | 2/2020 | Matthews et al. | |
| 10,710,065 B2 | 7/2020 | Helms et al. | |
| 10,792,392 B2 | 10/2020 | Kourtis et al. | |
| 10,869,950 B2 | 12/2020 | Kourtis et al. | |
| 11,053,193 B2 | 7/2021 | Berghofer et al. | |
| 2007/0055045 A1 | 3/2007 | Kiefer et al. | |
| 2010/0147704 A1 | 6/2010 | Xiong et al. | |
| 2010/0224867 A1 | 9/2010 | Heuft et al. | |
| 2010/0228025 A1 | 9/2010 | Cote et al. | |
| 2011/0217642 A1 | 9/2011 | Heuft et al. | |
| 2011/0281197 A1 | 11/2011 | Daikoku et al. | |
| 2012/0029236 A1* | 2/2012 | Cote | C07C 215/68 564/434 |
| 2012/0296189 A1 | 11/2012 | Bhogal et al. | |
| 2014/0054171 A1 | 2/2014 | Feldman et al. | |
| 2014/0088207 A1* | 3/2014 | Elabd | C08J 5/2231 521/38 |
| 2014/0099571 A1 | 4/2014 | Proietti et al. | |
| 2016/0251766 A1 | 9/2016 | Masel et al. | |
| 2016/0259256 A1 | 9/2016 | Cote et al. | |
| 2016/0293860 A1 | 10/2016 | Van Der Boom et al. | |
| 2017/0240473 A1 | 8/2017 | Budarin et al. | |
| 2019/0074710 A1 | 3/2019 | Hansen | |
| 2019/0168173 A1 | 6/2019 | Tsapatsis et al. | |
| 2019/0322114 A1 | 10/2019 | Sambhy et al. | |
| 2020/0388871 A1 | 12/2020 | Newbloom et al. | |
| 2021/0047242 A1 | 2/2021 | Liu et al. | |
| 2022/0127396 A1 | 4/2022 | Hartmann-Thompson et al. | |
| 2022/0223885 A1 | 7/2022 | Beh et al. | |
| 2022/0282041 A1 | 9/2022 | Swager et al. | |
| 2023/0250207 A1 | 8/2023 | Bae et al. | |
| 2024/0279376 A1* | 8/2024 | Yoshimura | H01B 1/122 |

FOREIGN PATENT DOCUMENTS

| | | | | |
|---|---|---|---|---|
| EP | 3476883 A1 | 5/2019 | | |
| EP | 3440239 B1 | 11/2020 | | |
| WO | WO 2006/016068 A2 | 2/2006 | | |
| WO | 2012045152 A1 | 4/2012 | | |
| WO | 2015178912 A1 | 11/2015 | | |
| WO | 2018143913 A1 | 8/2018 | | |
| WO | WO 2018/193021 A1 | 10/2018 | | |
| WO | 2022144900 A1 | 7/2022 | | |
| WO | WO-2022249666 A1 * | 12/2022 | | C08F 112/26 |

OTHER PUBLICATIONS

Cho et al., "Engineering Synergy: Energy and Mass Transport in Hybrid Nanomaterials," Advanced Materials 2015, 27, 5744-5752.

Chu et al., "Practical Implementation of bis-six-membered N-cyclic Quaternary Ammonium Cations in Advanced Anion Exchange Membranes for Fuel Cells: Synthesis and Durability," Journal of Membrane Science 578 (2019) 239-250.

Claussen et al., "Longitudinal polymer gradient materials based on crosslinked polymers," Polymer 55 (2014) 29-38.

Henkensmeier et al., "Overview: State-of-the Art Commercial Membranes for Anion Exchange Membrane Water Electrolysis," Journal of Electrochemical Energy Conversion and Storage, May 2021, vol. 18, pp. 024001-1 through 024001-18.

Holloczki et al., "Hydrolysis of Imidazole-2-ylidenes," Journal of the American Chemical Society, 2011, 133, 780-789.

Inagi, "Fabrication of Gradient Polymer Surfaces Using Bipolar Electrochemistry," Polymer Journal (2016) 48, 39-44.

Jaroszek et al., "Ion-exchange Membranes in Chemical Synthesis a Review," Open Chem. (2015) 14, 1-19.

Kaczur et al., "Carbon Dioxide and Water Electrolysis Using New Alkaline Stable Anion Membranes," Frontiers in Chemistry Technology Report, Jul. 2018, vol. 6, article 263, 16 pages.

Kaczur et al., "A Review of the Use of Immobilized Ionic Liquids in the Electrochemical Conversion of $CO_2$," Journal of Carbon Research (2020) 6, 33, 12 pages.

Kandambeth et al., "Selective Molecular Sieving in Self-Standing Porous Covalent-Organic-Framework Membranes," Advanced Materials 2017, 29, 1603945.

Kayser et al., "Cross-linked Sulfonated Poly(ether ether ketone) by Using Diamino-organosilicon for Proton Exchange Fuel Cells," The Journal of Physical Chemistry B (2011) 115, 2916-2923.

Koshikawa et al., "Single Nanometer-Sized NiFe-Layered Double Hydroxides as Anode Catalyst in Anion Exchange Membrane Water Electrolysis Cell with Energy Conversion Efficiency of 74.7% at 1.0 A $cm^{-2}$," American Chemical Society, ACS Catal. (2020) 10, 1886-1893.

Lee et al., "Poly(terphenylene) Anion Exchange Membranes: The Effect of Backbone Structure on Morphology and Membrane Property," ACS Macro Letters (2017) 6, 566-570.

Li et al., "Recent advances in the fabrication of advanced composite membranes," J. Mater. Chem. A, 2013, 1, 10058-10077.

Lin et al., Two-dimensional covalent triazine framework as an ultrathin-film nanoporous membrane for Desalination, Chem. Commun., 2015, 51, 14921-14924.

Liu et al., "Functional gradients and heterogeneities in biological materials: Design principles, functions, and bioinspired applications," Progress in Materials Science (2017), 88, 467-498.

Lu et al., "A novel 3D covalent organic framework membrane grown on a porous $\alpha$-$Al_2O_3$ substrate under solvothermal conditions," Chem. Commun., 2015, 51, 15562-15565.

Meng et al., "2D and 3D Porphyrinic Covalent Organic Frameworks: The Influence of Dimensionality on Functionality," Angew. Chem. 2020, 132, 3653-3658.

Meyers et al., "Structural Biological Materials: Critical Mechanics-Materials Connections," Science, vol. 339, Feb. 15, 2013, 773-779.

Moon et al., Sufonated PEEK Ion Exchange Membranes for Direct Methanol Fuel Cell Applications, Macromolecular Research (2007) vol. 15, No. 4, pp. 379-384.

Oh et al., "In vitro and in vivo characteristics of PCL scaffolds with pore size gradient fabricated by a centrifugation method," Biomaterials 28 (2007), 1664-1671.

Pedron et al, "Microfluidic approaches for the fabrication of gradient crosslinked networks based on poly(ethylene glycol) and hyperbranched polymers for manipulation of cell interactions," Journal of Biomedical Materials Research A, Jan. 2011, vol. 96, Issue 1, 196-203.

Qiu et al., "Alkaline imidazolium- and quaternary ammonium-functionalized anion exchange membranes for alkaline fuel cell applications," J. Mater. Chem., 2012, 22, 1040.

Ran et al., "Ion exchange membranes: New developments and applications," Journal of Membrane Science 522 (2017) 267-291.

Suhaimin et al., "Methanol Permeability and Properties of Polymer Electrolyte Membrane Based on Graphene Oxidesulfonated (Polyether Ether) Ketone," Malaysian Journal of Analytical Sciences, vol. 21, No. 2 (2017), 435-444.

Teng et al., "Preparation of Compositional Gradient Polymeric Films Based on Gradient Mesh Template," Polymers (2018) 10, 677 (15 pages).

Varcoe et al., "Anion-exchange membranes in electrochemical energy systems," Energy Environ. Sci., 2014, 7, 3135-3191.

Wang et al., "Efficient electrically powered $CO_2$-to-ethanol via suppression of deoxygenation," Nature Energy, 2020, 9 pages.

Wang et al., "N-cyclic quaternary ammonium-functionalized anion exchange membrane with improved alkaline stability enabled by aryl-ether free polymer backbones for alkaline fuel cells," Journal of Membrane Science 587, (2019), 117135.

Wang et al., "Novel Hydroxide-Conducting Polyelectrolyte Composed of an Poly(arylene ether sulfone) Containing Pendant Quaternary Guanidinium Groups for Alkaline Fuel Cell Applications," Macromolecules 2010, 43, 3890-3896.

Wang et al., "Stabilizing the Imidazolium Cation in Hydroxide-Exchange Membranes for Fuel Cells," ChemSusChem 2013, 6, 2079-2082.

Yang et al., "Functionally graded membranes from nanoporous covalent organic frameworks for highly selective water permeation," Journal of Materials Chemistry A, 2018, 6, 583-591.

(56) References Cited

OTHER PUBLICATIONS

Yang et al., The Application of Cation Exchange Membranes in Electrochemical Systems for Ammonia Recovery from Wastewater, Membranes 2021, 11, 494 (14 pages).
Yee et al., "The Effects of Sulfonated Poly(ether ether ketone) Ion Exchange Preparation Conditions on Membrane Properties," Membranes 2013, 3, 182-195.
Zhang et al., "Novel cross-linked anion exchange membranes with diamines as ionic exchange functional groups and crosslinking groups," International Journal of Hydrogen Energy 39 (2014) 13718-13724.
Wikipedia, "Sulfinic acid," Wikipedia—The Free Encyclopedia, Wikipedia.org, 2025, 3 pages, retrieved from the internet on Jul. 9, 2025: https://en.wikipedia.org/w/index.php?title=Sulfinic_acid&oldid=1295112493.
Claridge, Robert, "Physically Reinforced Structured Organic Film (SOF) Anion Exchange Membranes (AEMs)," U.S. Appl. No. 18/229,427, filed Aug. 2, 2023, 49 pages.
Marino, M.G., et al., "Alkaline Stability of Quaternary Ammonium Cations for Alkaline Fuel Cell Membranes and Ionic Liquids," ChemSusChem., vol. 8, 2015 (Published online Nov. 27, 2014), pp. 513-523.
Min, K., et al., "Crosslinked poly(m-terphenyl N-methyl piperidinium)-SEBS membranes with aryl-ether free and kinked backbones as highly stable and conductive anion exchange membranes," Journal of Membrane Science, vol. 653, Article 120487, 2022 (Available online Mar. 21, 2022), 11 pages.
Yuan, Y., et al., "Preparation of an Anion Exchange Membrane by Pyridine-Functionalized Polyether Ether Ketone to Improve Alkali Resistance Stability for an Alkali Fuel Cell," Energy Fuels, vol. 35, No. 4, Feb. 1, 2021, pp. 3360-3367.
Kalla et al., "Acylation of Phenols, Alcohols, Thiols, Amines and Aldehydes Using Sulfonic Acid Functionalized Hyper-Cross-Linked Poly(2-naphthol) as a Solid Acid Catalyst," Catalysis Letters, vol. 149, 2019 (Published online May 17, 2019), pp. 2696-2705.
Lancheros et al., "Development and Characterization of Poly(oxy-1-4-phenylenesulfonyl-1,4-phenylene) for Proton Exchange Membranes," Journal of Applied Engineering Science, vol. 19, No. 4, Aug. 2021, pp. 1013-1019.
Extended European Search Report mailed in EP 23193650.1 on Feb. 19, 2024. (9 pages).
Extended European Search Report for European Application No. 23193647.7 dated Feb. 5, 2024, 9 pages.
Extended European Search Report for European Application No. 23193651.9 dated Feb. 2, 2024, 18 pages.
Extended European Search Report mailed in EP 23196462.8 on Mar. 12, 2024. (8 Pages).
Aggarwal et al., "Ligand Valency Effects on the Alkaline Stability of Metallopolymer Anion-Exchange Membranes," Macromolecular Rapid Communications, vol. 42, Article 2100238, 2021 (Published online Jun. 25, 2021), 6 pages.
Disabb-Miller et al., "Water Uptake and Ion Mobility in Cross-Linked Bis(terpyridine)ruthenium-Based Anion Exchange Membranes," Macromolecules, vol. 46, 2013 (Published Nov. 22, 2013), pp. 9279-9287.
Kwasny et al., "Expanding metal cation options in polymeric anion exchange membranes," Journal of Materials Chemistry A, vol. 5, 2017 (Published Dec. 5, 2016), pp. 1400-1405.
Leech et al., "Effect of Composition of Polymer Backbone on Spectroscopic and Electrochemical Properties of Ruthenium(II) Bis(2,2'-bipyridyl)-containing 4-Vinylpyridine/Styrene Copolymers," Journal of Materials Chemistry, vol. 1. No. 4, Jan. 1991, pp. 629-635 (8 pages).
Yuan et al., "Ring-opening metathesis polymerization of cobaltocenium derivative to prepare anion exchange membrane with high ionic conductivity," Polyhedron, vol. 181, Article 114462, 2020 (Available online Mar. 2, 2020), pp. 1-7.
Zha et al., "Metal-Cation-Based Anion Exchange Membranes," Journal of the American Chemical Society (JACS), vol. 134, 2012 (Published Mar. 2, 2012), pp. 4493-4496.
Zhu et al., "Cationic Metallo-Polyelectrolytes for Robust Alkaline Anion-Exchange Membranes," Author Manuscript, Angew. Chem. Int. Ed., vol. 57, No. 9, Feb. 23, 2018 (First published Dec. 31, 2017), pp. 2388-2392 (7 pages).
Zhu et al., "Rational Synthesis of Metallo-Cations Toward Redox- and Alkaline-Stable Metallo-Polyelectrolytes," Journal of the American Chemical Society (JACS), vol. 142, 2020 (Published Dec. 17, 2019), pp. 1083-1089.
Farrugia, V.M., et al., "Gradient Membranes Formed From Free Standing Structured Organic Films and Methods Thereof," U.S. Appl. No. 17/946,001, filed Sep. 15, 2022, 42 pages.
Farrugia, V.M., et al., "Cation Exchange Membranes From Structured Organic Films and Methods Thereof," U.S. Appl. No. 17/946,003, filed Sep. 15, 2022, 39 pages.
Farrugia, V.M., et al., "Anion Exchange Membranes From Structured Organic Films and Methods Thereof," U.S. Appl. No. 17/946,006, filed Sep. 15, 2022, 38 pages.
Claridge, R., et al., "Structured Organic Films Containing N-Cyclic Quaternary Ammonium Having Cationic Charge Functionality and Methods Thereof," U.S. Appl. No. 18/051,800, filed Nov. 1, 2022, 42 pages.
Morimitsu, K., et al., "Ion Exchange Membranes (IEMS) With Ionic Ligand-Metal Complexes and Methods Thereof," U.S. Appl. No. 18/169,098, filed Feb. 14, 2023, 17 pages.
Farrugia, V., et al., "Flexible Structured Organic Film Membrane Formulations and Methods Thereof," U.S. Appl. No. 18/218,420, filed Jul. 5, 2023, 43 pages.
Claridge, R., et al., "Flexible Ionic Building Blocks With High Ionic Conductivity and Alkaline Stability for Use in Structured Organic Film (SOF) Containing Anion Exchange Membranes (AEMs)," U.S. Appl. No. 18/218,445, filed Jul. 5, 2023, 45 pages.
Guo et al., "A quaternary-ammonium-functionalized covalent organic framework for anion conduction," CrystEngComm (The Royal Society of Chemistry), vol. 19, 2017 (Published on Apr. 18, 2017), pp. 4905-4910 (7 pages total).
Abruña, H.D., "Fuel Cells—Alkaline Anion Exchange Membranes," The Department of Chemistry & Chemical Biology, Abruna Electrochemistry, publication date unknown (retrieved from the internet on Sep. 6, 2022), 5 pages, https://abruna.chem.cornell.edu/research/fuel-cells/.
Agnew, N.H., "Transition Metal Complexes of Poly(vinylpyridines)," Journal of Polymer Science: Polymer Chemistry Edition, vol. 14, 1976, pp. 2819-2830.
Author Unknown, "Polymer (matrix) structure—A236," CKN Knowledge in Practice Centre, publication date unknown (retrieved from the internet on Sep. 6, 2022), 7 pages, https://compositeskn. org/KPC/A236—Web Page last edited Mar. 10, 2021.
Non-Final Office Action for U.S. Appl. No. 18/169,098, dated Feb. 12, 2026.
Ma, H. et al., "Free-standing poly(2-vinylpyridine) foam films doped with silver nanoparticles formed at the planar liquid/liquid interface," Journal of Colloid and Interface Science, Jan. 3, 2013, 8 pages.
Kang, et al., "Free-standing, polysilsesquioxane-based inorganic/organic hybrid membranes for gas separations," Journal of Membrane Science 475 (2015), 384-394.

* cited by examiner

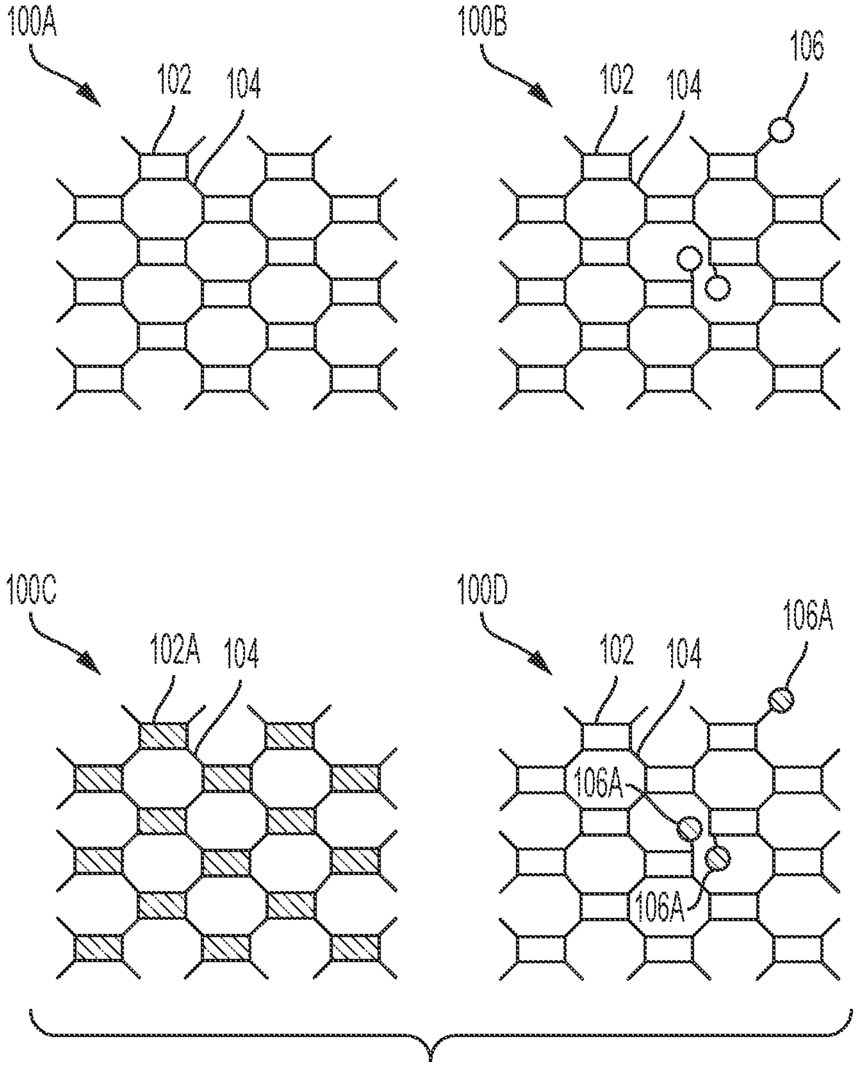
100A
102
104
100B
102
104
106
100C
102A
104
100D
102
104
106A
106A
106A

STRUCTURED ORGANIC FILMS CONTAINING IMIDAZOLIUM HAVING CATIONIC CHARGE FUNCTIONALITY AND METHODS THEREOF

TECHNICAL FIELD

The present teachings relate generally to free-standing structured organic films and, more particularly, to compositions for anionic exchange membranes containing imidazolium compounds formed from free-standing structured organic films.

BACKGROUND

Ion-exchange membranes (IEM) can be used in many electrochemical devices such as fuel cells, redox flow batteries, electrolyzers, reverse electrodialysis cells and bioelectrochemical systems (BES) such as microbial fuel cells. IEMs can be composed of hydrophobic substrates with immobilized ion-functionalized groups and mobile counterions. Depending on the type of ionic groups being transported, the IEMs can be anion exchange membranes (AEMs) or cation exchange membranes (CEMs). CEMs selectively transport cations (positively charged ions) across a permeable membrane. CEMs can be non-acidic such as those containing $Na^+$ cations, or acidic in the case of proton-exchange membranes (PEMs) which specifically transport $H^+$ cations. AEMs selectively transport anion and are available in non-alkaline anion forms (e.g. containing $Cl^-$ anions) and alkaline anions, designated AAEM, for example, $OH^-$, $CO_3^{2-}$ and $HCO_3^-$.

Imidazolium compounds can be used as ionic liquids with advantageous ion-exchange capabilities. Polymers functionalized with imidazolium ionic liquids have been used in anion exchange membranes. These materials can exhibit high ion conductivity as well as suitable alkaline stability due to the resonance inherent to the imidazolium ring. This makes these materials less susceptible to attack by hydroxide. This stability is imperative when the material is constantly subjected to alkaline conditions as part of an electrochemical cell, be it for a fuel cell or $CO_2$ reduction. An example of a commercially available IEM material includes materials made with a polystyrene backbone having pendant imidazolium chloride functional groups. $CO_2$ conversion cells with current densities of 200-600 $mA/cm^2$ and $CO_2$ to CO efficiencies up to 99% have been seen. In addition, high current densities for formate, ethanol and a record water hydrolysis efficiency have been reported along with many other uses as an AEM in electrochemical cells.

While such materials used in ion exchange membranes are typically polymers and cross-linked polymers, most known polymer chemistry synthesis processes do not provide precise control over the molecular-level structure of the formed material since most are randomly patterned. Most polymers are amorphous or partially amorphous except for some classes of linear polymers that can efficiently pack together resulting in high density with crystalline characteristics.

Therefore, it is desirable to fabricate ion exchange membranes synthesized from robust, highly ordered patterned network systems including imidazolium that can be used in a variety of applications such as fuel cells, redox flow batteries, electrolyzers, reverse electrodialysis cells, and microbial fuel cells.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A structured organic film (SOF) is disclosed. The structured organic film also includes a plurality of segments, a plurality of linkers, and a plurality of ionic capping segments, where at least one or more ionic capping segments may include imidazolium. Implementations of the structured organic film (SOF) include where a concentration of ionic capping segments in the SOF is from about 0.1 to about 5.0 molar equivalents of ionic capping segments as compared to a concentration of nonionic segments in the SOF. A thickness of the SOF is from about 100 nm to about 500 μm. At least one of the plurality of ionic capping segments may include n-hydroxyethyl-1,2,4,5-tetramethylimidazolium (NETMImBr). At least one of the plurality of ionic capping segments may include n-hydroxypropyl-1,2,4,5-tetramethylimidazolium (NPTMImBr). At least one of the plurality of ionic capping segments may include one or more hydroxide functional groups. The structured organic film (SOF) has an ion exchange capacity (IEC) of from about 0.25 meq/g to about 5.00 meq/g. An ion-exchange membrane may include the structured organic film (SOF). The structured organic film (SOF) is free-standing.

Another structured organic film (SOF) is disclosed. The structured organic film also includes a plurality of segments, and a plurality of linkers, where at least one or more ionic capping segments may include at least one cationic species may include n-hydroxyethyl-1,2,4,5-tetramethylimidazolium (NETMImBr). Implementations of the structured organic film (SOF) include where a concentration of ionic capping segments in the SOF is from about 0.1 to about 5.0 molar equivalents of ionic capping segments as compared to a concentration of nonionic segments in the SOF. A thickness of the SOF is from about 100 nm to about 500 μm. The structured organic film (SOF) has an ion exchange capacity (IEC) of from about 0.25 meq/g to about 5.00 meq/g.

Another structured organic film (SOF) is disclosed. The structured organic film also includes a plurality of segments, and a plurality of linkers, where the film also includes at least one or more ionic capping segments which may include at least one cationic species may include n-hydroxypropyl-1,2,4,5-tetramethylimidazolium (NPTMImBr). Implementations of the structured organic film (SOF) include where a concentration of ionic capping segments in the SOF is from about 0.1 to about 5.0 molar equivalents of ionic capping segments as compared to a concentration of nonionic segments in the SOF. A thickness of the SOF is from about 100 nm to about 500 μm. The structured organic film (SOF) has an ion exchange capacity (IEC) of from about 0.25 meq/g to about 5.00 meq/g.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 1 illustrates the differences between a standard structured organic film, a structured organic film having a capping segment, a structured organic film having molecular building blocks with ionic functionality, and a structured organic film having a capping segment with ionic functionality, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

"Structured organic film" (SOF) refers to a COF that is a film at a macroscopic level. The SOFs of the present disclosure have a capping segment or group added into the SOF formulation, which (after film formation), ultimately bonds to the SOF via at least one functional group located on the capping segment. SOFs of the present disclosure in certain examples can have non-ionic or ionic character, including cationic or anionic. This ionic character can be imparted by either a charged molecular building block or a capping group in the SOF structure.

In this specification and the claims that follow, singular forms such as "a," "an," and "the" include plural forms unless the content clearly dictates otherwise.

The term "SOF" generally refers to a covalent organic framework (COF) that is a film at a macroscopic level. The phrase "macroscopic level" refers, for example, to the naked eye view of the present SOFs. Although COFs are a network at the "microscopic level" or "molecular level" (requiring use of powerful magnifying equipment or as assessed using scattering methods), the present SOF is fundamentally different at the "macroscopic level" because the film is for instance orders of magnitude larger in coverage than a microscopic level COF network. SOFs described herein have macroscopic morphologies much different than typical COFs previously synthesized. Films as presently disclosed in a free-standing film example, or as coated onto a surface, include but are not limited to, a top surface and a bottom surface, in which "top" and "bottom" can be dependent on a temporal orientation or position of the film. Furthermore, a surface is still considered a surface even if adhered or bound to a substrate or other material. Films as presently disclosed in a free-standing film example, or as coated onto a surface, also include one or more edges, which can be, but are not limited to, one or more boundaries between where a film is present and where a film is not present.

Additionally, when a capping segment is introduced into the SOF, the SOF framework is locally 'interrupted' where the capping segments are present. These SOF compositions are 'covalently doped' because a foreign molecule is bonded to the SOF framework when capping segments are present. Capped SOF compositions may alter the properties of SOFs without changing constituent building block segments. For example, the mechanical and physical properties of the capped SOF where the SOF framework is interrupted may differ from that of an uncapped SOF or an SOF without capping segments.

The SOFs of the present disclosure are at the macroscopic level substantially pinhole-free SOFs or pinhole-free SOFs having continuous covalent organic frameworks that can extend over larger length scales such as for instance much greater than a millimeter to lengths such as a meter and, in theory, as much as hundreds of meters. It will also be appreciated that SOFs tend to have large aspect ratios where typically two dimensions of a SOF will be much larger than the third. SOFs have markedly fewer macroscopic edges and disconnected external surfaces than a collection of COF particles.

In examples, a "substantially pinhole-free SOF" or "pinhole-free SOF" may be formed from a reaction mixture deposited on the surface of an underlying substrate. The term "substantially pinhole-free SOF" refers, for example, to an SOF that may or may not be removed from the underlying substrate on which it was formed and contains substantially no irregular pinholes, blisters, ruptures, or gaps, such as those that would be considered coating defects that could form such as when a bubble ruptures during a film formation that is greater than the distance between the cores of two adjacent segments per square cm; such as, for example, less than 10 pinholes, pores or gaps greater than about 250 nanometers in diameter per $cm^2$, or less than 5 pinholes, pores or gaps greater than about 100 nanometers in diameter per $cm^2$. The term "pinhole-free SOF" refers, for example, to an SOF that may or may not be removed from the underlying substrate on which it was formed and contains no unintended pinholes or gaps greater than the distance between the cores of two adjacent segments per $micron^2$, such as no pinholes or gaps greater than about 500 Angstroms in diameter per $micron^2$. Pores that are intentionally and uniformly introduced into SOFs as tunable features for transport via a membrane are distinguished from pinholes for the purposes of this disclosure.

A need for ion exchange membranes, or more specifically anionic functional exchange membranes synthesized from highly ordered patterned network systems including imidazolium compounds that can be used in a variety of applications such as fuel cells, redox flow batteries, electrolyzers, reverse electrodialysis cells, and microbial fuel cells can be addressed by using covalent organic frameworks (COFs). Covalent organic frameworks (COFs) are highly patterned materials with molecular components called building blocks or building block segments which differ from monomers used to synthesis polymers. COFs react to form two- or three-dimensional networks made up of these building block segments that are linked to each other through strong covalent bonds. COFs are typically in powder form and are highly porous materials with extremely low densities. Examples of the present disclosure take advantage of COF's molecular building block approach to design structured organic films (SOFs) that also rely on the same segments, capping segments including imidazolium compounds and linkers as used to arrange COFs but at a macroscopic level are assembled as a film.

Examples of the present disclosure provide organic compositions containing imidazolium-based cations, for use as anion exchange membranes (AEMs). Synthetic methods for exemplary imidazolium containing compounds are also described herein. These anion exchange membranes can be used in electrochemical devices such as, but not limited to, electrolyzers for $H_2$, $NH_3$ production or $CO_2$ conversion, fuel cells, battery separators, and the like. The use of charged building blocks and/or ionic capping segments or groups to form the SOF composition allows the imidazolium functionalized species to be incorporated within and throughout the film network. The SOFs can be used as free standing films or coated over top a porous support to provide membranes that are stable against swelling and chemical or thermal degradation. The cationic species are fixed within the structured organic film (SOF) which are ordered or periodic at the molecular level. The benefits of ordered cationic SOF compositions lie in their functional characteristics, for example, minimal swelling, tunable ion exchange capacity (IEC) and high durability.

In embodiments, the SOF comprises at least one atom of an element that is not carbon, such at least one atom selected from the group consisting of hydrogen, oxygen, nitrogen, silicon, phosphorous, selenium, fluorine, boron, and sulfur. In further embodiments, the SOF is a boroxine-, borazine-, borosilicate-, and boronate ester-free SOF.

Molecular Building Block

The SOFs of the present disclosure comprise molecular building blocks also referred to as building block segments having a segment (S) and functional groups (Fg). Molecular building blocks require at least two functional groups ($x \geq 2$) and may comprise a single type or two or more types of functional groups. Functional groups are the reactive chemical moieties of molecular building blocks that participate in a chemical reaction to link together segments during the SOF forming process. A segment is the portion of the molecular building block that supports functional groups and comprises an atoms that are not associated with functional groups. Further, the composition of a molecular building block segment remains unchanged after SOF formation.

Functional Group

Functional groups are the reactive chemical moieties of molecular building blocks that may participate in a chemical reaction to link together segments during the SOF forming process. Functional groups may be composed of a single atom, or functional groups may be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, imines, ureas, aldehydes, isocyanates, tosylates, alkenes, alkynes and the like. Other examples can include, but are not limited to haloformyls, oxygen containing groups (e.g. hydroxyls, anhydrides, carbonyls, carboxyls, carbonates, carboxylates, aldehydes, esters, hydroperoxy, peroxy, ethers, and orthoesters), nitrogen-containing groups (e.g. carboxamides, amines, imines, imides, azides, azos, cyanates, isocyanates, nitrates, nitriles, isonitriles, nitrosos, nitros, nitrosooxy), sulfur-containing groups (sulfhydryls, sulfides, disulfides, sulfinyls, sulfos, thiocyanates, isothiocyanates, and carbonothioyls), phosphorous-containing groups (e.g. phosphinos, phosphonos, and phosphates), silicon-containing groups ($Si(OH)_3$, $Si(SH)_4$, silanes, silyls, and siloxanes), boron containing groups (e.g. boronic acid, boronic esters, and boronic ethers), metal or metalloid-containing groups (e.g. $Ge(OH)_3$, $Ge(SH)_4$, $AsO_3H$, $AsO_4H$, $As(SH)_3$, $Sn(OH)_3$, $Sn(CH_3)_3$, and $Sn(Bu)_3$), or combinations thereof.

Molecular building blocks contain a plurality of chemical moieties, but only a subset of these chemical moieties are intended to be functional groups during the SOF forming process. Whether or not a chemical moiety is considered a functional group depends on the reaction conditions selected for the SOF forming process. Functional groups (Fg) denote a chemical moiety that is a reactive moiety, that is, a functional group during the SOF forming process.

In the SOF forming process the composition of a functional group will be altered through the loss of atoms, the gain of atoms, or both the loss and the gain of atoms; or, the functional group may be lost altogether. In the SOF, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the SOF. Linker groups are described below.

Capping Segments Ionic Capping Segments and Ionic Building Blocks

Capping segments of the present disclosure are molecules that 'interrupt' the regular network of covalently bonded building blocks normally present in an SOF, and may further incorporate an ionic charging functionality into the SOF network. An SOF including one or more capping segments may also be referred to as capped SOFs. The differences between a SOF and SOFs having capping segments, capping segments having ionic functionality, or molecular building blocks having ionic functionality are illustrated in FIG. 1. FIG. 1 illustrates the differences between a standard structured organic film, a structured organic film having a capping segment, a structured organic film having molecular building blocks with ionic functionality, and a structured organic film having a capping segment with ionic functionality. Various networks of SOFs are shown, wherein a typical SOF network 100A is shown in FIG. 1A, having several segments 102 connected by several linkers 104. Another SOF network 100B is representative of a capped SOF network 100B having several segments 102 connected by several linkers 104, wherein a capping segment 106 closes off or terminates a branch of the segment 102. In SOF network 100C, a plurality of segments having ionic functionality, also referred to as an ionic building block 102A are shown to be connected by linkers 104. In SOF network 100D, a plurality of segments 102 connected by several linkers 104 are illustrated, wherein a capping segment having an ionic group 106A closes off or terminates a branch of the segment 102. Capping segments can be absent an ionic group as in capping segment 106 or have an ionic group as in caping segment 106A, but have only one linking functional group (Fg) that reacts to terminate or close off a branch of a segment 102 of an SOF. The ionic group on a capping segment can have ionic character initially or via a chemical reaction or treatment in a post-processing step after formation of the SOF. Molecular building blocks can be absent an ionic group as in segment 102 or have an ionic group as in ionic building block 102A. Molecular building blocks 102, 102A also have more than one linking Fg that reacts with the SOF to form the SOF network. The ionic group on a molecular building block can have ionic character initially or via a chemical reaction or treatment in a post-processing step after formation of the SOF. While the exemplary SOF networks 100A, 100B, 100C, 100D illustrate the inclusion of various components to an SOF network of the present disclosure, they are non-limiting, and certain examples of SOF networks of the present disclosure can have some or all of the various segments, linkers, capping segments, ionic capping segments, molecular building blocks, ionic molecular building blocks, or combinations thereof.

Capped SOF compositions or SOF compositions having ionic groups in either the segments or molecular building blocks, or capping segments can provide tunable materials whose properties can be varied through the type and amount of ionic groups introduced. Conventional membranes used in IEC or charged membrane applications are typically made by providing a polymer or network backbone, followed by subsequent introduction of a charge functionality. Examples of the present disclosure provide structured organic networks where during synthesis, ionic or charged capping segments or alternatively ionic or charged molecular building blocks are incorporated into the structured organic network. As noted previously, in certain examples, charge can be either present upon network formation or induced after network formation by a chemical reaction or post-processing step such as, but not limited to those as described herein. For purposes of the present disclosure, a capping segment having an ionic group prior to processing or after processing or formation may be referred to as an ionic capping segment. Furthermore, a molecular building block having an ionic group prior to processing or after processing or formation may be referred to as an ionic molecular building block or ionic building block or ionic segment.

In embodiments, the capping molecules have one reactive functional group to bond to the SOF network. In other words, a capping segment is the portion of a capping group or capping unit that supports functional groups and comprises atoms that are not associated with functional groups. Further, the composition of a capping segment remains unchanged after SOF formation.

A capping segment molecule has one functional group that has suitable or complementary functional groups (as described above) to participate in a chemical reaction to link to another segment during the SOF forming process. A second chemical moiety that is not suitable or complementary to participate in the specific chemical reaction to link together segments during the SOF forming process and thus cannot bridge any further adjacent molecular building blocks. However, after the SOF is formed such functional groups may be available for further reaction with additional components and thus allowing for the further refining and tuning of the various properties of the formed SOF.

Cationic species such as cationic molecular building block segments and capping groups for use in SOF films useful for anion exchange membranes of the present disclosure can include imidazolium containing SOF films having improved alkaline stability. Illustrative examples of imidazolium compounds useful for providing IEC and alkaline stability to SOF films for anion exchange membranes include N-hydroxyethyl-1,2,4,5-tetramethylimidazolium bromide (NETMImBr), N-hydroxypropyl-1,2,4,5-tetramethylimidazolium bromide (NPTMImBr), or combinations thereof. Illustrative examples can include alkyl/aryl precursors having an alcohol functional group and a primary halogen to undergo the quaternization reaction. Examples can include, but are not limited to, 4-bromobutan-1-ol, 5-bromopentan-1-ol, 3-bromo-1,2-propanediol etc, or 4-(2-bromoethyl)phenol or combinations thereof.

SOFs having capping segments or capping segment precursors may further include capping segments that directly provide an ionically charged functionality, or alternatively can be capping segments that can be induced to have ionic charge during or after film formation processes. For example, methyl triethanol ammonium hydroxide (MTEAH) can be reacted with THM-TBD (4 eq. MTEAH to 3 eq. THM-TBD). The quaternized membrane or film is then washed with deionized (DI) water and can be further soaked in 1M NaOH for 24 h to ensure the counter ion is hydroxide. Additionally, hydroxyquinonesulfonic acid can be reacted with THM-TBD (2 eq. HQSA to 1 eq. THM-TBD). The resulting cationic exchange membrane or film can then be washed with deionized (DI) water and can be immersed in a solution containing a saturated concentration of KCl to ensure complete replacement of any $H^+$ ions with $K^+$ ions. The protons released from the film are neutralized with sodium carbonate (0.005M) where phenolphthalein is used as an indicator. Another example includes a sulfonic acid capping group that can be treated with sodium hydroxide, for example, after film formation to provide an anionic SOF network. In certain examples, molecular building block segments can also impart ionic charge, as well as capping groups.

In embodiments, the SOF may comprise a mixture of capping segments, such as any combination of a first capping segment, a second capping segment, a third capping segment, a fourth capping segment, etc., where the structure of the capping segment varies. In embodiments, the structure of a capping segment or a combination of multiple capping segments may be selected to either enhance or attenuate the chemical and physical properties of SOF; or the identity of the chemical moieties or functional group(s) on that are not suitable or complementary to participate in the chemical reaction to link together segments during the SOF forming process may be varied to form a mixture of capping segments. Thus, the type of capping segment introduced into the SOF framework may be selected to introduce or tune a desired property of SOF.

In embodiments, a SOF contains segments, which are not located at the edges of the SOF, that are connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments. In embodiments, Type 2 and 3 SOFs contains at least two segment types, which are not located at the edges of the SOF, where at least one segment type is connected by linkers to at least three other segments and/or capping groups. For example, in embodiments the SOF comprises at least one symmetrical building block selected from the group consisting of ideal triangular building block segments, distorted triangular building block segments, ideal tetrahedral building block segments, distorted tetrahedral building block segments, ideal square building block segments, and distorted square building block segments.

In embodiments, the SOF comprises a plurality of segments, where all segments have an identical structure, and a plurality of linkers, which may or may not have an identical structure, wherein the segments that are not at the edges of the SOF are connected by linkers to at least three other segments and/or capping groups. In embodiments, the SOF comprises a plurality of segments where the plurality of segments comprises at least a first and a second segment that are different in structure, and the first segment is connected by linkers to at least three other segments and/or capping groups when it is not at the edge of the SOP.

In embodiments, the SOF comprises a plurality of linkers including at least a first and a second linker that are different in structure, and the plurality of segments either comprises at least a first and a second segment that are different in structure, where the first segment, when not at the edge of the SOF, is connected to at least three other segments and/or capping groups, wherein at least one of the connections is via the first linker, and at least one of the connections is via the second linker; or comprises segments that all have an identical structure, and the segments that are not at the edges of the SOF are connected by linkers to at least three other segments and/or capping groups, wherein at least one of the connections is via the first linker, and at least one of the connections is via the second linker.

In embodiments, the capping segments have a structure that substantially corresponds to the structure of one of the molecular building blocks (such as the molecular building blocks for SOFs that are detailed in U.S. Pat. Nos. 8,093,347; 8,436,130; 8,357,432; 8,394,495; 8,389,060; 8,318,892; and 9,097,995, which have been incorporated by reference) that is added to the SOF formulation, but one or more of the functional groups present on the building block is either missing or has been replaced with a different chemical moiety or functional group that will not participate in a chemical reaction (with the functional group(s) of the building blocks that are initially present) to link together segments during the SOF forming process.

A capping segment having a structure unrelated to the molecular building block or segment in the SOF may be, for example, an alkyl moiety (for example, a branched or unbranched saturated hydrocarbon group, derived from an alkane and having the general formula $C_nH_{2n+1}$, in which n is a number of 1 or more) in which one of the hydrogen atoms has been replaced by an —OH group. In such a formulation, a reaction between the capping segment and the molecular building block or segment, for example, a reaction between the alcohol (—OH) groups, would link the capping segment and the molecular building blocks together through the formation of (linking) ether groups. Other functional group reactions as described herein are applicable as well.

In embodiments, the capping segment molecules are mono-functionalized. For example, in embodiments, the capping segments comprise only a single suitable or complementary functional group (as described above) that participates in a chemical reaction to link together segments during the SOF forming process and thus cannot bridge any further adjacent molecular building blocks (until a building block with a suitable or complementary functional group is added, such as when an additional SOF is formed on top of a capped SOF base layer and a multilayer SOF is formed).

When such capping segments are introduced into the SOF coating formulation, upon curing, interruptions in the SOF framework are introduced. Interruptions in the SOF framework are therefore sites where the single suitable or complementary functional group of the capping segments have reacted with the molecular building block and locally terminate (or cap) the extension of the SOF framework and interrupt the regular network of covalently bonded building blocks normally present in an SOF. The type of capping segments (or structure of the capping segment) introduced into the SOF framework may be used to tune the properties of the SOF.

In embodiments, the capping segment molecules may comprise more than one chemical moiety or functional group. For example, the SOF coating formulation, which (after film formation), ultimately becomes bonded in the SOF may comprise a capping segment having at least two or more chemical moieties or functional groups, such as 2, 3, 4, 5, 6 or more chemical moieties or functional groups, where only one of the functional groups is a suitable or complementary functional group (as described above) that participates in a chemical reaction to link together segments during the SOF forming process. The various other chemical moieties or functional groups present on the molecular building block are chemical moieties or functional groups that are not suitable or complementary to participate in the specific chemical reaction to link together segments initially present during the SOF forming process and thus cannot bridge any further adjacent molecular building blocks. However, after the SOF is formed such chemical moieties and/or functional groups may be available for further reaction (similar to dangling functional groups, as discussed below) with additional components and thus allow for the further refining and tuning of the various properties of the formed SOF, or chemically attaching various other SOF layers in the formation of multilayer SOFs.

In embodiments, the molecular building blocks may have x functional groups (where x is two or more), with at least one molecular building block type having at least three functional groups) and the capping segment molecules may comprise a capping segment molecule having 1 functional groups that are suitable or complementary functional group (as described above) and participate in a chemical reaction to link together segments during the SOF forming process. For example, x would be three for tris-(4-hydroxymethyl)triphenylamine (above), and x would be four for the building block illustrated below, N,N,N',N'-tetrakis-[(4-hydroxymethyl)phenyl]-biphenyl-4,4'-diamine (THM-TBD):

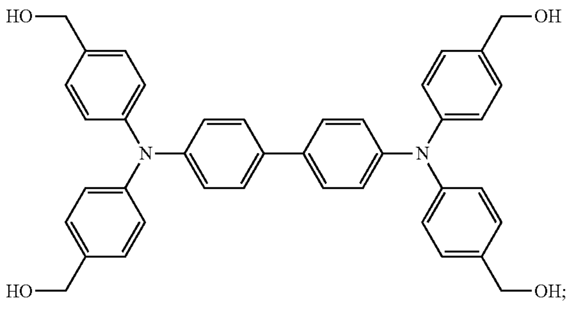 [SMILES: OCc1ccc(N(c2ccc(CO)cc2)c2ccc(-c3ccc(N(c4ccc(CO)cc4)c4ccc(CO)cc4)cc3)cc2)cc1]

;

or tetra-(methyl 4-hydro-methylphenyl ether)biphenyl-4,4'-diamine (TME-TBD):

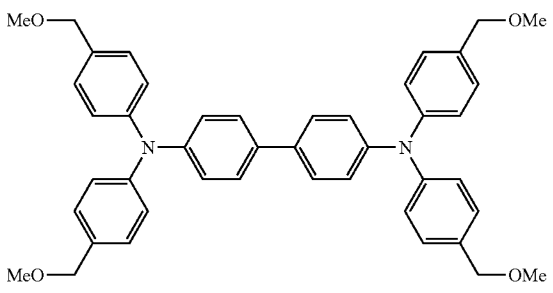 [SMILES: COCc1ccc(N(c2ccc(COC)cc2)c2ccc(-c3ccc(N(c4ccc(COC)cc4)c4ccc(COC)cc4)cc3)cc2)cc1]

Segment

A segment is the portion of the molecular building block that supports functional groups and comprises all atoms that are not associated with functional groups. Further, the composition of a molecular building block segment remains unchanged after SOF formation. In embodiments, the SOF may contain a first segment having a structure the same as or different from a second segment. In other embodiments, the structures of the first and/or second segments may be the same as or different from a third segment, forth segment, fifth segment, etc. A segment is also the portion of the molecular building block that can provide an inclined property. Inclined properties are described later in the embodiments.

In specific embodiments, the segment of the SOF comprises at least one atom of an element that is not carbon, such at least one atom selected from the group consisting of hydrogen, oxygen, nitrogen, silicon, phosphorous, selenium, fluorine, boron, and sulfur.

A description of various exemplary molecular building blocks, linkers, SOF types, strategies to synthesize a specific SOF type with exemplary chemical structures, building blocks whose symmetrical elements are outlined, and classes of exemplary molecular entities and examples of members of each class that may serve as molecular building blocks or other components for SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

Linker

A linker is a chemical moiety that emerges in a SOF upon chemical reaction between functional groups present on the molecular building blocks and/or capping segments.

A linker may comprise a covalent bond, a single atom, or a group of covalently bonded atoms. The former is defined as a covalent bond linker and may be, for example, a single covalent bond or a double covalent bond and emerges when functional groups on all partnered building blocks are lost entirely. The latter linker type is defined as a chemical moiety linker and may comprise one or more atoms bonded together by single covalent bonds, double covalent bonds, or combinations of the two. Atoms contained in linking groups originate from atoms present in functional groups on molecular building blocks prior to the SOF forming process. Chemical moiety linkers may be well-known chemical groups such as, for example, esters, ketones, amides, imines. ethers, urethanes, carbonates, and the like, or derivatives thereof.

For example, when two hydroxyl (—OH) functional groups are used to connect segments in a SOF via an oxygen atom, the linker would be the oxygen atom, which may also be described as an ether linker. In embodiments, the SOF may contain a first linker having a structure the same as or different from a second linker. In other embodiments, the structures of the first and/or second linkers may be the same as or different from a third linker, etc.

A capping segment may be bonded in the SOF in any desired amount as long as the general SOF framework is sufficiently maintained. For example, in embodiments, a capping segment may be bonded to at least 0.1% of all linkers, but not more than about 40% of all linkers present in an SOF, such as from about 0.5% to about 30%, or from about 2% to about 20%. In embodiments, substantially all segments may be bound to at least one capping segment, where the term "substantially all" refers, for example, to more than about 95%, such as more than about 99% of the segments of the SOF. In the event capping segments bond to more than 50% of the available functional groups on the molecular building blocks (from which the linkers emerge), oligomers, linear polymers, and molecular building blocks that are fully capped with capping segments may predominately form instead of a SOF. In certain examples of SOFs, capping segments may be quantitatively expressed in terms of mol %, concentration, or as ratios compared to either a segment composition or of an entire SOF composition.

In specific embodiments, the linker comprises at least one atom of an element that is not carbon, such at least one atom selected from the group consisting of hydrogen, oxygen, nitrogen, silicon, phosphorous, selenium, fluorine, boron, and sulfur.

Metrical Parameters of SOFs

SOFs have any suitable aspect ratio. In embodiments, SOFs have aspect ratios for instance greater than about 30:1 or greater than about 50:1, or greater than about 70:1, or greater than about 100:1, such as about 1000:1. The aspect ratio of a SOF is defined as the ratio of its average width or diameter (that is, the dimension next largest to its thickness) to its average thickness (that is, its shortest dimension). The term 'aspect ratio,' as used here, is not bound by theory. The longest dimension of a SOF is its length and it is not considered in the calculation of SOF aspect ratio.

Generally, SOFs have widths and lengths, or diameters greater than about 500 micrometers, such as about 10 mm, or 30 mm. The SOFs have the following illustrative thicknesses: about 10 Angstroms to about 250 Angstroms, such as about 20 Angstroms to about 200 Angstroms, for a mono-segment thick layer and about 20 nm to about 5 mm, about 50 nm to about 10 mm for a multi-segment thick layer.

SOF dimensions may be measured using a variety of tools and methods. For a dimension about 1 micrometer or less, scanning electron microscopy is the preferred method. For a dimension about 1 micrometer or greater, a micrometer (or ruler) is the preferred method.

Multilayer SOFs

A SOF may comprise a single layer or a plurality of layers (that is, two, three or more layers). SOFs that are comprised of a plurality of layers may be physically joined (e.g., dipole and hydrogen bond) or chemically joined. Physically attached layers are characterized by weaker interlayer interactions or adhesion; therefore physically attached layers may be susceptible to delamination from each other. Chemically attached layers are expected to have chemical bonds (e.g., covalent or ionic bonds) or have numerous physical or intermolecular (supramolecular) entanglements that strongly link adjacent layers.

Therefore, delamination of chemically attached layers is much more difficult. Chemical attachments between layers may be detected using spectroscopic methods such as focusing infrared or Raman spectroscopy, or with other methods having spatial resolution that can detect chemical species precisely at interfaces. In cases where chemical attachments between layers are different chemical species than those within the layers themselves it is possible to detect these attachments with sensitive bulk analyses such as solid-state nuclear magnetic resonance spectroscopy or by using other bulk analytical methods.

In the embodiments, the SOF may be a single layer (mono-segment thick or multi-segment thick) or multiple layers (each layer being mono-segment thick or multi-segment thick). "Thickness" refers, for example, to the smallest dimension of the film. As discussed above, in a SOF, segments are molecular units that are covalently bonded through linkers to generate the molecular framework of the film. The thickness of the film may also be defined in terms of the number of segments that is counted along that axis of the film when viewing the cross-section of the film. A "monolayer" SOF is the simplest case and refers, for example, to where a film is one segment thick. A SOF where two or more segments exist along this axis is referred to as a "multi-segment11 thick SOF.

An exemplary method for preparing physically attached multilayer SOFs includes: (1) forming a base SOF layer that may be cured by a first curing cycle, and (2) forming upon the base layer a second reactive wet layer followed by a second curing cycle and, if desired, repeating the second step to form a third layer, a fourth layer and so on. The physically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be physically stacked. Alternative examples of SOFs according to the present disclosure include free-standing films. The free-standing film thickness can be from about 1 μm to about 500 μm, or from about 10 μm to about 250 μm, or from about 100 μm to about 150 μm.

In embodiments, a multilayer SOF is formed by a method for preparing chemically attached multilayer SOFs by: (1) forming a base SOF layer having functional groups present on the surface (or dangling functional groups) from a first reactive wet layer, and (2) forming upon the base layer a second SOF layer from a second reactive wet layer that comprises molecular building blocks with functional groups capable of reacting with the dangling functional groups on the surface of the base SOF layer. In further embodiments, a capped SOF may serve as the base layer in which the functional groups present that were not suitable or complementary to participate in the specific chemical reaction to link together segments during the base layer SOF forming process may be available for reacting with the molecular building blocks of the second layer to form a chemically bonded multilayer SOF. If desired, the formulation used to form the second SOF layer should comprise molecular building blocks with functional groups capable of reacting with the functional groups from the base layer as well as additional functional groups that will allow for a third layer to be chemically attached to the second layer. The chemically stacked multilayer SOFs may have thicknesses greater than about 20 Angstroms such as, for example, the following illustrative thicknesses: about 20 Angstroms to about 10 mm, such as about 1 nm to about 10 mm, or about 0.1 mm Angstroms to about 5 mm. In principle there is no limit with this process to the number of layers that may be chemically stacked.

In embodiments, the method for preparing chemically attached multilayer SOFs comprises promoting chemical attachment of a second SOF onto an existing SOF (base layer) by using a small excess of one molecular building block (when more than one molecular building block is present) during the process used to form the SOF (base layer) whereby the functional groups present on this molecular building block will be present on the base layer surface. The surface of base layer may be treated with an agent to enhance the reactivity of the functional groups or to create an increased number of functional groups.

In an embodiment the dangling functional groups or chemical moieties present on the surface of an SOF or capped SOF may be altered to increase the propensity for covalent attachment (or, alternatively, to disfavor covalent attachment) of particular classes of molecules or individual molecules, such as SOFs, to a base layer or any additional substrate or SOF layer. For example, the surface of a base layer, such as an SOF layer, which may contain reactive dangling functional groups, may be rendered pacified through surface treatment with a capping chemical group. For example, a SOF layer having dangling hydroxyl alcohol groups may be pacified by treatment with trimethylsiylchloride thereby capping hydroxyl groups as stable trimethylsilylethers. Alternatively, the surface of base layer may be treated with a non-chemically bonding agent, such as a wax, to block reaction with dangling functional groups from subsequent layers.

Molecular Building Block Symmetry

Molecular building block symmetry relates to the positioning of functional groups (Fgs) around the periphery of the molecular building block segments. Without being bound by chemical or mathematical theory, a symmetric molecular building block is one where positioning of Fgs may be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is practiced in embodiments of the present disclosure for two reasons: (1) the patterning of molecular building blocks may be better anticipated because the linking of regular shapes is a better understood process in reticular chemistry, and (2) the complete reaction between molecular building blocks is facilitated because for less symmetric building blocks errant conformations/orientations may be adopted which can possibly initiate numerous linking defects within SOFs.

In embodiments, a Type 1 SOF contains segments, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks. In embodiments, Type 2 and 3 SOF contains at least one segment type, which are not located at the edges of the SOF, that are connected by linkers to at least three other segments. For example, in embodiments the SOF comprises at least one symmetrical building block selected from the group consisting of ideal triangular building blocks, distorted triangular building blocks, ideal tetrahedral building blocks, distorted tetrahedral building blocks, ideal square building blocks, and distorted square building blocks.

Practice of Linking Chemistry

In embodiments linking chemistry may occur wherein the reaction between functional groups produces a volatile byproduct that may be largely evaporated or expunged from the SOF during or after the film forming process or wherein no byproduct is formed. Linking chemistry may be selected to achieve a SOF for applications where the presence of linking chemistry byproducts is not desired. Linking chemistry reactions may include, for example, condensation, addition/elimination, and addition reactions, such as, for example, those that produce esters, imines, ethers, carbonates, urethanes, amides, acetals, and silyl ethers.

In embodiments the linking chemistry via a reaction between function groups producing a non-volatile byproduct that largely remains incorporated within the SOF after the film forming process. Linking chemistry in embodiments may be selected to achieve a SOF for applications where the presence of linking chemistry byproducts does not impact the properties or for applications where the presence of linking chemistry byproducts may alter the properties of a SOF (such as, for example, the electroactive, hydrophobic or hydrophilic nature of the SOF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an important aspect of the present disclosure. Reasons for controlling the rate and extent of reaction may include adapting the film forming process for different coating methods and tuning the microscopic arrangement of building blocks to achieve a periodic SOF, as defined in earlier embodiments.

Innate Properties of •COFs

COFs have innate properties such as high thermal stability (typically higher than 400° C. under atmospheric conditions); poor solubility in organic solvents (chemical stability), and porosity (capable of reversible guest uptake). In embodiments, SOFs may also possess these innate properties.

Added Functionality of SOFs

Added functionality denotes a property that is not inherent to conventional COFs or SOFs and may occur by the selection of molecular building blocks wherein the molecular compositions provide the added functionality in the resultant SOF. Added functionality may arise upon assembly of molecular building blocks and/or capping segments having an “inclined property” for that added functionality. Added functionality may also arise upon assembly of molecular building blocks having no “inclined property” for that added functionality but the resulting SOF has the added functionality as a consequence of linking segments (S) and linkers into a SOF. In embodiments, added functionality may also arise upon the addition and assembly of molecular building blocks and capping segments having no “inclined property” for that added functionality but the resulting SOF has the added functionality as a consequence of linking segments, linkers, and capping segments into a SOF. Furthermore, emergence of added functionality may arise from the combined effect of using molecular building blocks bearing an “inclined property” for that added functionality whose inclined property is modified or enhanced upon linking together the segments and linkers into a SOF.

An Inclined Property of a Molecular Building Block

The term “inclined property” of a molecular building block refers, for example, to a property known to exist for certain molecular compositions or a property that is reasonably identifiable by a person skilled in art upon inspection of the molecular composition of a segment. As used herein, the terms “inclined property” and “added functionality” refer to the same general property (e.g., hydrophobic, electroactive, etc.) but “inclined property” is used in the context of the molecular building block and “added functionality” is used in the context of the SOF.

The hydrophobic (superhydrophobic), hydrophilic, lipophobic (superlipophobic), lipophilic, photochromic and/or electroactive (conductor, semiconductor, charge transport material) nature of an SOF are some examples of the properties that may represent an “added functionality” of an SOP. These and other added functionalities may arise from the inclined properties of the molecular building blocks or may arise from building blocks that do not have the respective added functionality that is observed in the SOF.

The term hydrophobic (superhydrophobic) refers, for example, to the property of repelling water, or other polar species such as methanol, it also means an inability to absorb water and/or to swell as a result. Furthermore, hydrophobic implies an inability to form strong hydrogen bonds to water or other hydrogen bonding species. Hydrophobic materials are typically characterized by having water contact angles greater than 90° and superhydrophobic materials have water contact angles greater than 150° as measured using a contact angle goniometer or related device.

The term hydrophilic refers, for example, to the property of attracting, adsorbing, or absorbing water or other polar species, or a surface that is easily wetted by such species. Hydrophilic materials are typically characterized by having less than 20° water contact angle as measured using a contact angle goniometer or related device. Hydrophilicity may also be characterized by swelling of a material by water or other polar species, or a material that can diffuse or transport water, or other polar species, through itself. Hydrophilicity, is further characterized by being able to form strong or numerous hydrogen bonds to water or other hydrogen bonding species.

The term lipophobic (oleophobic) refers, for example, to the property of repelling oil or other non-polar species such as alkanes, fats, and waxes. Lipophobic materials are typically characterized by having oil contact angles greater than 90° as measured using a contact angle goniometer or related device.

The term lipophilic (oleophilic) refers, for example, to the property attracting oil or other non-polar species such as alkanes, fats, and waxes or a surface that is easily wetted by such species. Lipophilic materials are typically characterized by having a low to nil oil contact angle as measured using, for example, a contact angle goniometer. Lipophilicity can also be characterized by swelling of a material by hexane or other non-polar liquids.

The term photochromic refers, for example, to the ability to demonstrate reversible color changes when exposed to electromagnetic radiation. SOF compositions containing photochromic molecules may be prepared and demonstrate reversible color changes when exposed to electromagnetic radiation. These SOFs may have the added functionality of photochromism. The robustness of photochromic SOFs may enable their use in many applications, such as photochromic SOFs for erasable paper, and light responsive films for window tinting/shading and eyewear. SOF compositions may contain any suitable photochromic molecule, such as a difunctional photochromic molecules as SOF molecular building blocks (chemically bound into SOF structure), a monofunctional photochromic molecules as SOF capping segments (chemically bound into SOF structure, or unfunctionalized photochromic molecules in an SOF composite (not chemically bound into SOF structure). Photochromic SOFs may change color upon exposure to selected wavelengths of light and the color change may be reversible.

SOF compositions containing photochromic molecules that chemically bond to the SOF structure are exceptionally chemically and mechanically robust photochromic materials. Such photochromic SOF materials demonstrate many superior properties, such as high number of reversible color change processes, to available polymeric alternatives.

SOFs having a rough, textured, or porous surface on the sub-micron to micron scale may be hydrophobic. The rough, textured, or porous SOF surface can result from dangling functional groups present on the film surface or from the structure of the SOF. The type of pattern and degree of patterning depends on the geometry of the molecular building blocks and the linking chemistry efficiency. The feature size that leads to surface roughness or texture is from about 100 nm to about 10 μm, such as from about 500 nm to about 5 μm.

Process for Preparing an Ionic Structured Organic Film (SOF)

The process for making ionic SOFs (which may be referred to as an "SOF" below) typically comprises a similar number of activities or steps (set forth below) that are used to make a non-ionic SOF. The ionic segment may be added during either step a, b or c depending the desired distribution of the ionic segment in the resulting SOF. For example, if it is desired that the ionic segment distribution is substantially uniform over the resulting SOF, the ionic segment may be added during step a. Alternatively, if, for example, a more heterogeneous distribution of the ionic segment is desired, adding the ionic segment (such as by spraying it on the film formed during step b or during the promotion step of step c) may occur during steps b and c. Alternatively, the ionic segment may be innately ionic, or can be subjected to an additional post-processing step, e.g., after step c) to add or react with a capping segment or molecular building block to provide an ionic group.

The process for making SOFs typically comprises a number of activities or steps (set forth below) that may be performed in any suitable sequence or where two or more activities are performed simultaneously or in close proximity in time:

A process for preparing a structured organic film comprising:

(a) preparing a liquid-containing reaction mixture comprising a plurality of molecular building blocks each comprising a segment and a number of functional groups;

(b) depositing the reaction mixture as a wet film;

(c) promoting a change of the wet film including the molecular building blocks to a dry film comprising the SOF comprising a plurality of the segments and a plurality of linkers arranged as a covalent organic framework, wherein at a macroscopic level the covalent organic framework is a film;

(d) optionally removing the SOF from the coating substrate to obtain a free-standing SOF;

(e) optionally processing the free-standing SOF into a roll;

(f) optionally cutting and seaming the SOF into a belt; and (g) optionally performing the above SOF formation process(es) upon an SOF (which was prepared by the above SOF formation process(es)) as a substrate for subsequent SOF formation process(es).

The above activities or steps may be conducted at atmospheric, super atmospheric, or subatmospheric pressure. The term "atmospheric pressure" as used herein refers to a pressure of about 760 torr. The term super atmospheric, refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed. Further considerations related to the aforementioned process steps or processes for preparing or fabricating SOFs are detailed in U.S. Pat. Nos. 8,093,347; 8,436,130; 8,357,432; 8,394,495; 8,389,060; 8,318,892; and 9,097,995, the disclosures of which are totally incorporated herein by reference in their entireties.

FIG. 2 represents a simplified side view of exemplary electrochemical systems containing an anionic exchange membrane made from an SOF having ionic charge functionality in accordance with the present disclosure. An anionic exchange membrane 200 (AEM) which can be formed from an SOF in accordance with the present disclosure, is illustrated. Positive ions 206 and negative ions 208 are shown in the presence of the anionic exchange membrane 200 and a corresponding anode 202 and cathode 204 of an electrochemical system. The anionic exchange membrane 200 contains positively charged moieties within the structure of the anionic exchange membrane 200 such that the anionic exchange membrane 200 permits to negative ions 208 transport through the anionic exchange membrane 200 while positive ions 206 are prevented from passing through the anionic exchange membrane 200.

Examples of the present disclosure include various CEM and AEM-type SOFs which have been made to evaluate the ion exchange capacity (IEC) of these materials. The IEC is a parameter that provides the number of cationic groups for AEMs or the number of anionic groups for CEMs based on number of equivalents (frequently milliequivalents) per gram of dry membrane. IEC is an ion-exchange capacity, also referred to as a charge per mass of polymer expressed either in milliequivalents of charge per gram of polymer, meq/g. In certain examples, a doubly charged ion within the polymer has twice the equivalents of charge as compared to a singly charged ion.

As described herein, a variety of ionic molecules, or ionic molecule precursors, that can be used as molecular building blocks or capping groups. In the present examples, a cationic or anionic species from Table 1 with one of the two aromatic building block molecules (THM-TBD or TME-TBD) as described previously. The reaction mechanisms employed in the examples are based on the formation of ether linkages (transetherification) but the reaction linkages can be extended to B—O (boroxine, boronate ester, spiroborate, and borosilicate), C═N (imine, hydrazone, and squaraine), C—N (β-ketoenamine, imide, and amide), in other examples. Examples of the present disclosure include ionic capping segments added to SOFs based on molar equivalents. A molar equivalent is a ratio of moles of a capping segment, such as N-hydroxyethyl-1,2,4,5-tetramethylimidazolium bromide, to moles of a molecular building block, such as THM-TBD. This ratio or concentration of capping segments to segments can be from about 0.5, to about 10.0, or from about 1.0 to about 5.0, or from about 1.0 to about 2.5, based on a total concentration of segments in the SOF. This ratio or concentration of capping segments to segments can be from about 0.5, to about 10.0, or from about 1.0 to about 5.0, or from about 1.0 to about 2.5. Molar equivalents of ionic capping segments as compared to non-ionic segments, or nonionic segments, can also be from about 0.5, to about 10.0, or from about 1.0 to about 5.0, or from about 1.0 to about 2.5. The upper limit of ionic capping group segments depends on the number of reactive functional group sites on a given molecular building block segment. It cannot exceed n−2, where n is the number of reactive functional groups on a molecular building block segment, otherwise a linear polymer or small molecules can form.

EXAMPLES

Comparative Example 1 describes Sustainion®, a commercially available AEM, which is based on the free radical polymerization of styrene and vinyl benzyl chloride that is then functionalized with 1,2,4,5-tetramethylimidazole in a Dowanol PM (1-methoxy-2 propanol) solvent. Divinylbenzene is also added as a crosslinker to help improve the membrane's strength. This membrane class from Dioxide Materials™ is reported to have typical IECs ranging from 0.6 to 1.2 mEq/g depending on the grade chosen. A representative reaction scheme is depicted below:

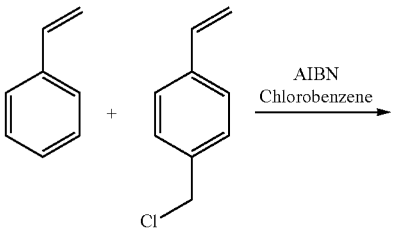

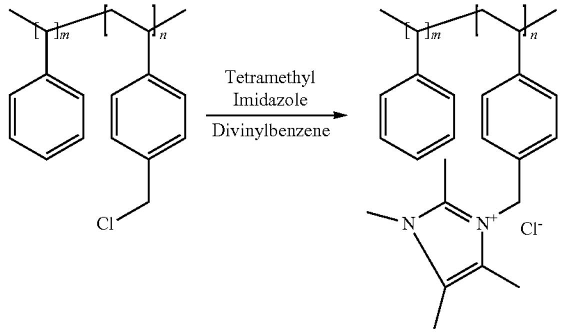

Control Example

SOF Synthesized from THM-TBD Building Block and No Charged Species

Dowanol PM (1-methoxy-2-propanol, 9.0190 g), Nacure 5225 (0.0127, 0.25 wt. %), Silclean 3700 (0.0501, 1.0 wt. %) and THM-TBD (0.9878 g, 98.75 wt. %) were added to a 4 dram vial in the stated order. The vial was placed in a block heater and heated at 65° C. for 90 minutes. Three grams of solution was then cured at 120° C. for 40 minutes in an aluminum pan. The IEC value of this film was 0 mEq/g (measured by manual titration), as expected due to an absence of charged groups.

Synthesis of Imidazolium Ionic Capping Segments

Synthesis of N-hydroxyethyl-1,2,4,5-tetramethylimidazolium bromide (NETMImBr)

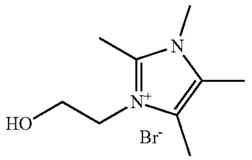

A 200 mL bomb flask was purged with argon. To the flask was added 1,2,4,5-tetramethylimidazole (3.73 g, 30 mmol), 60 mL dry toluene and 2-bromoethanol (4.87 g, 39 mmol). The flask was sealed, heated to 75° C. and stirred for 72 hours. After the reaction time, there was an oil phase (product) at the bottom of the flask. To the reaction mixture was added 20 mL of deionized (DI) water. The aqueous phase was collected and washed with 2×20 mL of ethyl acetate to give light yellow oil. Oil triturated with 20 mL of ethyl acetate to give white powder (6.88 g, 92% yield).

Synthesis of N-hydroxypropyl-1,2,4,5-tetramethylimidazolium bromide (NPTMImBr)

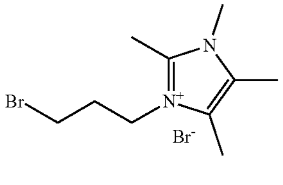

The synthesis of NPTMImBr was conducted under the same conditions and utilizing the same reagents as the synthesis of NETMImBr but using 3-bromo-1-propanol instead of 2-bromoethanol.

Example 1

N-hydroxyethyl-1,2,4,5-tetramethylimidazolium bromide THM-TBD Film

THM-TBD (1.37 g, 2.3 mmol) dissolved in 6 g DMSO. Sonicated for 20 min to ensure dissolution. N-hydroxyethyl-1,2,4,5-tetramethylimidazolium (0.5634 g, 2.3 mmol) bromide dissolved in 2 g DMSO in separate vial. After the sonication of the THM-TBD solution, the imidazolium bromide solution was added and the mixture was once again sonicated for 6 minutes to ensure dissolution. Lastly, the pTSA catalyst (0.06 g, 0.35 mmol) was then added to vial. Weights reported in Table 1, below, are weight in % of solids taking into account stoichiometry of the total weight of the formulation.

TABLE 1

| Formulation details of Example 1 | | | | | | |
|---|---|---|---|---|---|---|
| Desired Component: | Role | Linking Sites | % Active Component | Ratio/ Stoichio-metry | wt % of Solids | Total Mass (g) |
| NETMImBr | Capping Segment | 1 | 100 | 1 | 28.17 | 0.5634 |
| THM-TBD | Building Block | 4 | 100 | 1 | 68.83 | 1.3766 |
| pTSA monohydrate | Catalyst | — | — | 100 | 3.00 | 0.0600 |
| Dimethyl sulfoxide (DMSO) | Solvent | — | — | 1 | — | 8.0000 |

Example 2

N-hydroxypropyl-1,2,4,5-tetramethylimidazolium-bromide THM-TBD Film

THM-TBD (1.37 g, 2.3 mmol) dissolved in 6 g DMSO. Sonicated for 20 min to ensure dissolution. N-hydroxypropyl-1,2,4,5-tetramethylimidazolium (0.5856 g, 2.3 mmol) bromide dissolved in 2 g DMSO in separate vial. After the sonication of the THM-TBD solution, the imidazolium bromide solution was added and the mixture was once again sonicated for 6 minutes to ensure dissolution. Lastly, the pTSA catalyst (0.06 g, 0.35 mmol) was then added to vial. Weights reported in Table 2, below, are weight in % of solids taking into account stoichiometry of the total weight of the formulation.

TABLE 2

| Formulation details of Example 2 | | | | | | |
|---|---|---|---|---|---|---|
| Desired Component: | Role | Linking Sites | % Active Component | Ratio/ Stoichio-metry | wt % of Solids | Total Mass (g) |
| NETMImBr | Capping Segment | 1 | 100 | 1 | 28.17 | 0.5634 |
| THM-TBD | Building Block | 4 | 100 | 1 | 68.83 | 1.3766 |
| pTSA monohydrate | Catalyst | — | — | 100 | 3.00 | 0.0600 |
| Dimethyl sulfoxide (DMSO) | Solvent | — | — | 1 | — | 8.0000 |

An example reaction scheme, shown below, is representative of the reaction that occurs during the curing process of the SOF formulations. Upon addition of an acid catalyst and exposure to heat, the building block and capping segment undergo a condensation reaction to produce an ether-linked cationic network.

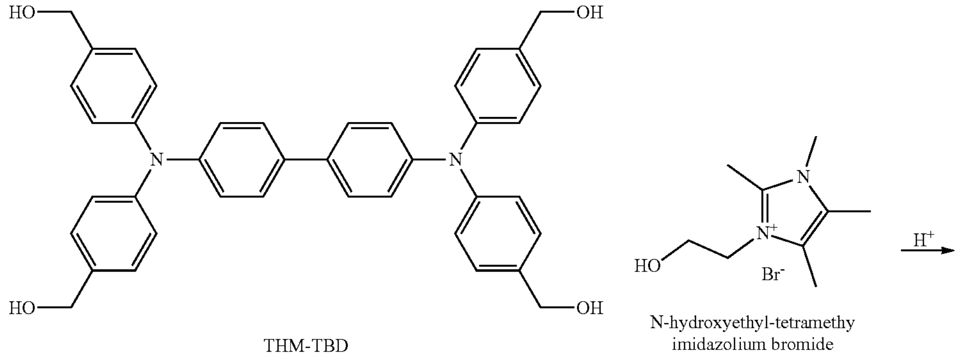

THM-TBD

N-hydroxyethyl-tetramethy imidazolium bromide

-continued

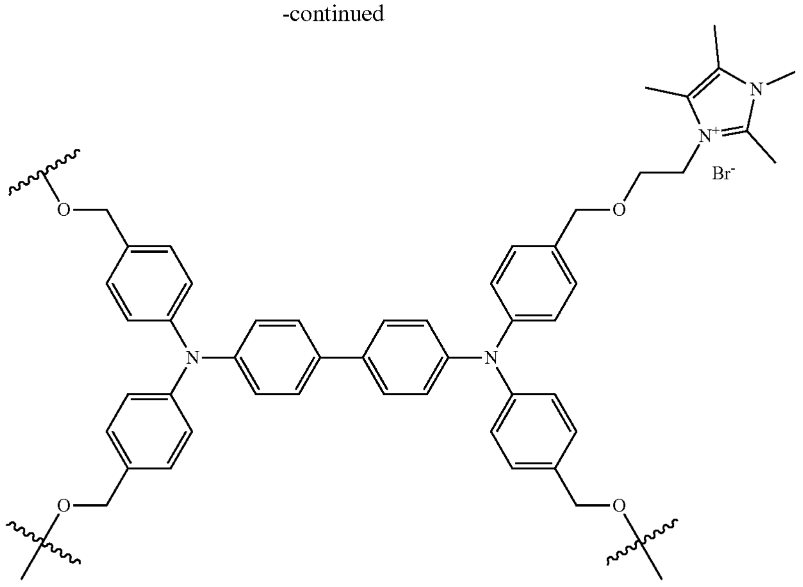

Capped THM-TBD
SOF

Slot Die Coating

The imidazolium containing SOF formulations of Examples 1 and 2 were coated onto 2 polyether ether ketone (PEEK) polymer fiber screens. The two screens are classified as 35 um (fine) and 220 um (coarse), the cited dimensions referring to the distance between adjacent fibers. The 35 μm screen has an open area of 22% while the 220 μm screen has an open area of 56%. The formulation of Example 1 (EXP-21-AC1543) was coated onto 35 μm PEEK screen with flow rate of 10 μL/s and 15 μL/s, followed by being cured in autoclave at 180° C. for 30 min. The formulation with the N-hydroxyethyl-1,2,4,5-tetramethylimidazolium-bromide capping segment (Example 1) was observed to provide adequate films for both 10 and 15 μL/s flow rates. However, a flow rate of 10 μl/s resulted in some defects whereas the coating made with the 15 μL/s was observed to have no visible holes.

Example 2 (EXP-21-AC1551) was coated onto a 35 μm PEEK screen with a flow rate of 15 μL/s, cured both via open air and autoclaved at 180° C. for 30 min. Coatings made using the N-hydroxypropyl-1,2,4,5-tetramethylimidazoliumbromide capping segment were observed to be defect free. However, the film that formed through open air curing was observed to be fully cured whereas the film cured in the autoclave was not fully cured, as described further in Table 3.

Example 2 (EXP-21-AC1551) was also coated onto a coarser PEEK screen (220 um) using a flow rate of 20 μL/s with a much larger open area of 56%, vs the 22% for the 35 um screen. The material filled all of the pores with no obvious defects and was found to be fully cured after being exposed to THF for 24 hours. By comparison, other formulations containing THM-TBD and alternative cationic capping segments such as tris(2-hydroxyethyl)methylammonium hydroxide were unable to sufficiently coat this coarser screen and the film was observed pulling away from the fibers.

TABLE 3

Determination of curing by weight loss of film after submersion in THF for 24 hours

| Sample | Temp. | Screen (μm) | Coating Rate (μL/s) | Curing Method | % diff. After THF Soak | Cured? |
|---|---|---|---|---|---|---|
| Example 1 | 180° C. | 35 | 10 | Autoclave | −6.16 | No |
| Example 1 | 180° C. | 35 | 15 | Open Air | 0 | Yes |
| Example 1 | 180° C. | 220 | 20 | Open Air | 0 | Yes |
| Example 2 | 180° C. | 35 | 15 | Open Air | −0.49 | Yes |
| Example 2 | 180° C. | 35 | 15 | Autoclave | −16.02 | No |
| Example 2 | 180° C. | 220 | 20 | Open Air | 0 | Yes |

Example coated films were subjected to a 24-hour THF soak to determine if the films were fully cured. It can be noted from the curing test data in Table 3, that attempting to cure materials in an environment with trapped solvent (i.e. autoclave, or in the case of very thick films) results in films that are not fully cured. Furthermore, these films are greenish in color compared to the yellowish color of the films cured in open air. The films that were heated open to the environment were found to be fully cured.

Visual inspection of coated example formulations exhibited full coating of the open areas in both the fine (35 um) and coarse (220 um) PEEK screen for the N-hydroxyethyltetramethyl-imidazoliumbromide formulation (Example 1). The coating was observed to completely fill all pores in both screens and did not pull away from the PEEK fibers during curing. No cracking or holes were observed.

Additional visual inspection of coated example formulations exhibited full coating of the open areas in both the fine (35 um) and coarse (220 um) PEEK screen for the N-hydroxypropyltetramethyl-imidazoliumbromide formulation (Example 2). The coating was observed to completely fill all pores in both screens and did not pull away from the PEEK fibers during curing. A minimal amount of cracking was noted, but this is believed to be addressable with the use of additives to improve film formation. Additional samples are listed in Table 4 and Table 5.

Ion Exchange Capacity:

TABLE 4

Ion exchange capacities of imidazolium containing SOF films.

| Ion Exchange Capacity: Sample | Imidazolium Building Block | Film Type | IEC (meq/g) |
|---|---|---|---|
| Example 1 | N-Hydroxyethyl | Free-Standing | 0.8205 |
| Example 1 | N-Hydroxyethyl | 220 um PEEK Screen | 0.613 |
| Example 2 | N-Hydroxypropyl | 220 um PEEK Screen | 0.712 |

TABLE 5

Ion exchange capacities of imidazolium containing SOF films.

| Sample | Imidazolium Building Block | Cation Eq. | Screen Size (um) | Coating Rate (uL/s) | Curing Method | IEC (meq/g) (after wash) |
|---|---|---|---|---|---|---|
| AC1564 | 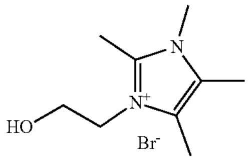 | 2 | 35 | 15 | Open Air | 1.04 |
| AC1564 | 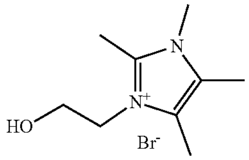 | 2 | 220 | 20 | Open Air | 0.94 |
| AC1593 | 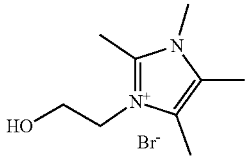 | 3 | 220 | 20 | Open Air | 2.40 |

Films made by incorporating the hydroxyethyl (Example 1) and hydroxypropylimidazolium (Example 2) capping segments into the THM-TBD SOF system exhibited very good ion exchange capacities. A formulation of Example 1 provided IEC results of 0.8205 meq/g and 0.613 meq/g for a free-standing film and 220 um coated PPEK screen, respectively. A formulation Example 2 gave an IEC value of 0.712 meq/g for a film coated on a 220 um screen. By comparison, THM-TBD films functionalized with cationic groups (MTEAH) have exhibited IEC values as high as 0.357 in other experiments. This shows by comparison a higher ion exchange capabilities of imidazolium groups in examples 1 and 2. A commercially available AEM, tetramethylimidazolium chloride functionalized Sustainion™, has an IEC value of 1.17. The ionic SOF materials of the present disclosure exhibit similar ion conductivity with relatively low imidazolium content while providing enhanced mechanical and resistive properties as compared to commercially available AEMs due to the crosslinked network of the films demonstrated in Examples 1 and 2.

Examples of the present disclosure provide structured organic films (SOF) composed of building blocks where at least one building block or segment is uncharged with 4 functional groups for linking and a second building block or capping segment containing a charged (or ionic), or ionic precursor species and at least one functional group for linking. The charged species can have 1 to 4 functional groups, where in certain examples the Fg is —OH, creating either an network with charged end-capped species or else can be part of the internal SOF network if fg>1. Structured organic films for use as anionic exchange membranes including imidazolium-based cationic species with ion exchange capacity (IEC) according to the present disclosure have been demonstrated. The free-standing SOF films are able to facilitate the preferential transport of counter-ions as measured by IEC, and in some examples are advantaged over commercially known materials, and are chemically stable in highly alkaline solutions and organic solvents such as THF. Applications of SOFs of the present disclosure include systems for electrochemical energy conversion and separation devices such as fuel cells, redox flow batteries, electrodialysis, reverse electrodialysis, water electrolysis and electrosynthesis.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A structured organic film (SOF), comprising:

a plurality of building block segments;

a plurality of linkers; and a plurality of ionic capping segments, wherein at least one or more ionic capping segments comprises imidazolium; and wherein a capped ionic network of the structured organic film comprises:

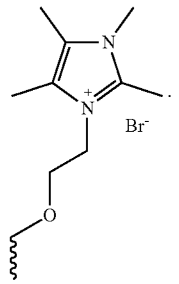

2. The structured organic film (SOF) of claim 1, wherein a thickness of the SOF is from about 100 nm to about 500 μm.

3. The structured organic film (SOF) of claim 1, wherein a capped ionic network of the structured organic film further comprises:

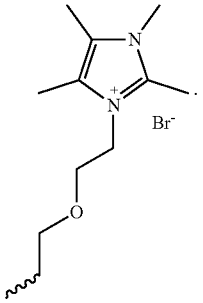

4. An ion-exchange membrane, comprising the structured organic film (SOF) of claim 1.

5. The ion-exchange membrane of claim 4, wherein the structured organic film (SOF) is free-standing.

6. A structured organic film (SOF), comprising:

a plurality of building block segments; and a plurality of linkers; wherein at least one of the plurality of building block segments comprises:

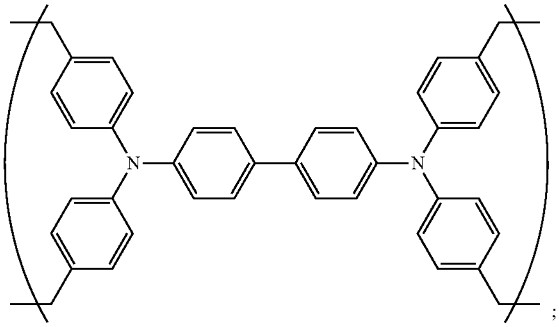

;

and wherein a capped ionic network of the structured organic film comprises:

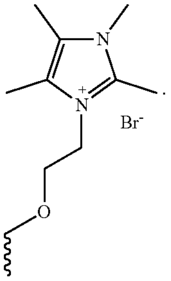

.

7. The structured organic film (SOF) of claim 6, wherein a thickness of the SOF is from about 100 nm to about 500 μm.

8. A structured organic film (SOF), comprising:

a plurality of building block segments; and a plurality of linkers; wherein; and at least one of the plurality of building block segments comprises:

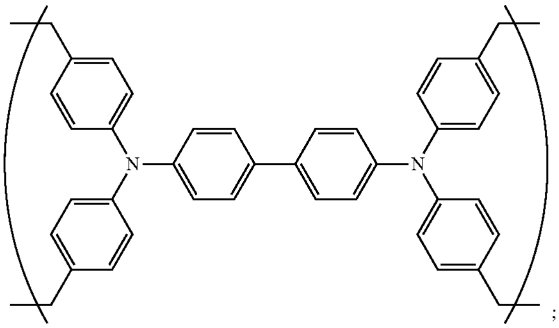

;

and wherein a capped ionic network of the structured organic film comprises:

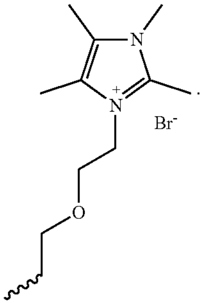

.

9. The structured organic film (SOF) of claim 8, wherein a thickness of the SOF is from about 100 nm to about 500 μm.

* * * * *